United States Patent
Roth et al.

(10) Patent No.: US 9,124,671 B2
(45) Date of Patent: Sep. 1, 2015

(54) MEDIA SERVICE AND METHOD FOR DELIVERY OF STORED MEDIA

(75) Inventors: Todd Stuart Roth, Shadow Hills, CA (US); Stanley Robert Moote, Toronto (CA)

(73) Assignee: Imagine Communicaions Corp., Frisco, TX (US)

( * ) Notice: Subject to any disclaimer, the term of this patent is extended or adjusted under 35 U.S.C. 154(b) by 226 days.

(21) Appl. No.: 13/313,201

(22) Filed: Dec. 7, 2011

(65) Prior Publication Data

US 2013/0151493 A1   Jun. 13, 2013

(51) Int. Cl.
G06F 17/30 (2006.01)
H04L 29/06 (2006.01)
H04N 21/2343 (2011.01)
H04N 21/472 (2011.01)

(52) U.S. Cl.
CPC ........ *H04L 65/602* (2013.01); *G06F 17/30017* (2013.01); *H04L 65/80* (2013.01); *H04N 21/2343* (2013.01); *H04N 21/472* (2013.01)

(58) Field of Classification Search
CPC .......... G06F 17/3074; G06F 17/30781; G06F 17/30017; G04L 65/602
USPC ................................................ 707/703, 736
See application file for complete search history.

(56) References Cited

U.S. PATENT DOCUMENTS

| | | | |
|---|---|---|---|
| 6,615,252 B1 * | 9/2003 | Oka et al. | 709/219 |
| 7,886,054 B1 | 2/2011 | Nag et al. | |
| 7,916,755 B2 | 3/2011 | Hasek et al. | |
| 7,962,640 B2 | 6/2011 | Lee | |
| 7,966,642 B2 | 6/2011 | Nair et al. | |
| 7,996,495 B2 | 8/2011 | Dekel et al. | |
| 8,024,762 B2 | 9/2011 | Britt | |
| 8,055,783 B2 | 11/2011 | Brannon, Jr. | |
| 2002/0053078 A1 * | 5/2002 | Holtz et al. | 725/14 |
| 2002/0069295 A1 * | 6/2002 | Edwards et al. | 709/246 |
| 2003/0078986 A1 * | 4/2003 | Ayres et al. | 709/217 |
| 2004/0073925 A1 * | 4/2004 | Kinoshita | 725/46 |
| 2008/0066010 A1 | 3/2008 | Brodersen et al. | |
| 2009/0182843 A1 | 7/2009 | Hluchyj et al. | |
| 2009/0282077 A1 * | 11/2009 | Thomas | 707/104.1 |
| 2010/0114857 A1 * | 5/2010 | Edwards et al. | 707/709 |
| 2010/0325199 A1 * | 12/2010 | Park et al. | 709/203 |
| 2011/0288946 A1 * | 11/2011 | Baiya et al. | 705/26.1 |
| 2013/0031162 A1 * | 1/2013 | Willis et al. | 709/203 |

* cited by examiner

*Primary Examiner* — Jensen Hu
(74) *Attorney, Agent, or Firm* — Tarolli, Sundheim, Covell & Tummino LLP (57) ABSTRACT

A system includes an application programming interface (API) configured to process a transaction request that specifies data content located at a storage medium. A request processor associated with the API can be configured to determine a delivery format for the data content in response to the transaction request. A file converter can be configured to transform the data content into the delivery format in accordance with the transaction request.

26 Claims, 5 Drawing Sheets

MEDIA SERVICE AND METHOD FOR DELIVERY OF STORED MEDIA

TECHNICAL FIELD

This disclosure relates to a media service and method for delivery of stored media.

BACKGROUND

Current data storage systems such as large, cloud-based systems, are oriented for exact data storage requirements where data must be stored in exactly the format it is received. In one example, a large collection of servers forming a cloud may store data for subscribers where data is stored for each subscriber in the format in which the data is received. In another example, media files such as audio or video files may need to be stored redundantly in various compression formats in order that the subscriber can retrieve such files from the cloud in a format and quality for a given application. Not only are subscribers often confused about which formats to store and which formats provide the desired quality such as playback resolution, but storing files in this manner (e.g., redundantly) raises the requirements for more storage capability than may otherwise be necessary.

SUMMARY

A media service and method for delivery of stored media are disclosed. In one example, a system includes an application programming interface (API) configured to process a transaction request that specifies media data content located at a storage medium. A request processor associated with the API can be configured to determine a delivery format for the media data content in response to the transaction request. A file converter can be configured to transform the media data content into the delivery format in accordance with the transaction request.

In another example, a method includes receiving a transaction request for a media data file stored on a storage medium. This includes determining a delivery format for the media data file in response to the transaction request. The method also includes outputting the media data file in the delivery format compatible with the transaction request.

In yet another example, a system includes an input application programming interface (API) configured to transcode a media data file into a storage format that mitigates storage requirements of a storage medium. The system includes a transaction application programming interface (API) configured to process a transaction request for the media data file from the storage medium. A file converter associated with the transaction API can be configured to translate the media data file into a format that is compatible with the transaction request.

DETAILED DESCRIPTION

This disclosure relates to a media service and method for delivery of stored media. The media service and method can implement in a virtualized storage environment and delivering the data according to various formats upon request. According to one example, media data such as audio or video files can be stored in a format that mitigates storage requirements of a storage medium, such as transcoding and/or transrating the data according to a plurality of available compression formats. Files can be stored in a single storage format. After storing the data, subscribers can retrieve the data upon request. Such request can specify the format requirements for retrieving the media data or a profile for the requestor can specify how the media data should be delivered. By formatting the media data based on the subscribers request and upon demand, the subscriber is relieved from having to determine complex requirements to originally store the media data while storage capabilities of the medium can be improved since files can be stored more efficiently according to the common storage formats.

Figure 1:
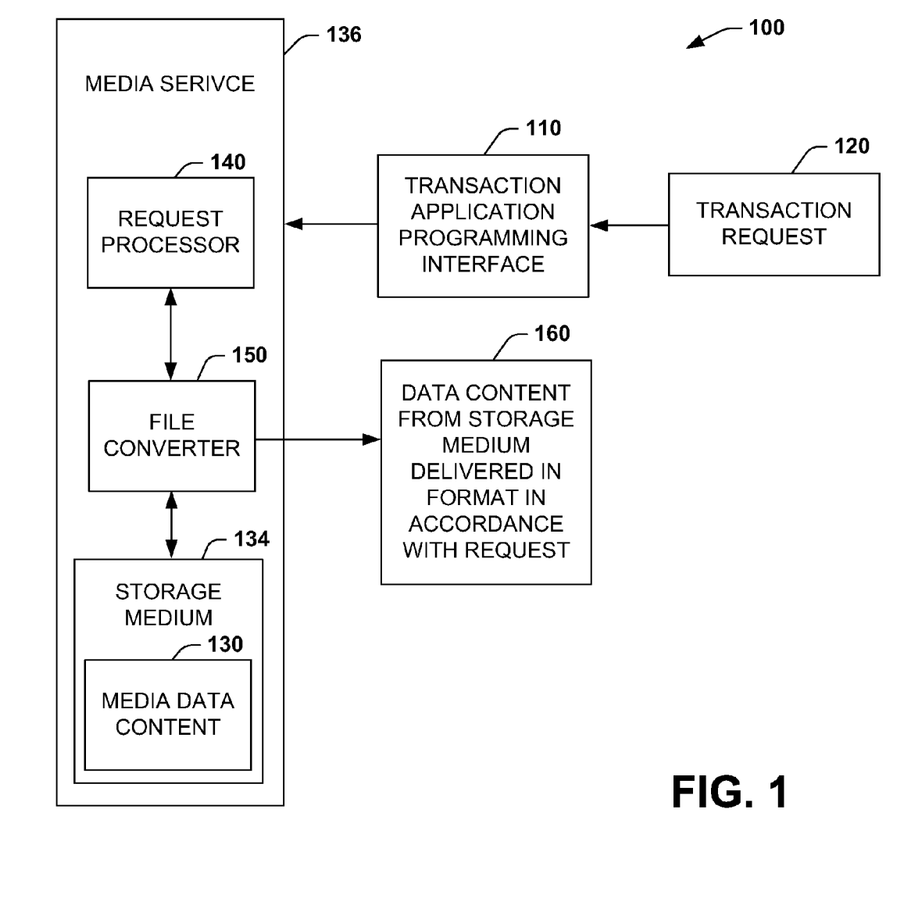
FIG. 1 illustrates an example of a system for providing virtual format storage and delivery of media data.

FIG. 1 illustrates an example of a system 100 for providing virtual format storage and delivery of media data. The system 100 includes a transaction application programming interface (API) 110 configured to receive a transaction request 120 that specifies media data content 130. The API 110 can expose functionality associated with a media service 136 to retrieve requested content from a storage medium 134 and process the content to one or more corresponding delivery formats responsive to the request 120. The storage medium 134 can store the media data content 130 in a storage format such as a single version of the media data content 130 as opposed to a plurality of versions stored for conventional storage systems. For instance, the storage format can be a high resolution (e.g., native) version of the media data content or it may be a transcoded version to mitigate storage requirements for the storage medium 134. The media data content 130 can include digital media assets, such as television programs having audio and video components, radio programs having audio components, and the like.

A request processor 140 in the media service 136 can be configured to determine a delivery format for the media data content 130 stored at the storage medium 134 and in response to the transaction request 120. A file converter 150 can be configured to transform the media data content 130 from the storage format of the storage medium 134 into the delivery format in accordance with the transaction request at 160, wherein the media data content is delivered in a desired format and/or other specifications as described below. The media service 136 can output multiple different versions of the media content, each having a respective delivery format for a given request, which can be provided in a single output file or in individual respective files.

The delivery format can be substantially any format that is appropriate for fulfilling the transaction request 120. For example, if the storage format were in an MPEG 4 format and 1080i resolution, the delivery format could be into an MOV format and 720p resolution (e.g., via transcoding and transrating functions of the converter 150). As mentioned above, the delivery format can include a plurality of differing formats that are translated from the storage format of the storage medium 134 based on the transaction request 120. It is noted that the transaction request 120 (or associated request profile described below) does not supply a copy or version of the media data content 130. The transaction request 120 (or profile) merely specifies the desired media and possibly the delivery format which is generated on demand by the file converter 150.

In one example, the delivery format for the media data content 130 and delivered at 160 by the file converter 150 can be specified in the transaction request 120. In another example, the delivery format can be specified in a subscriber profile (not shown) associated with the transaction request 120. For example, the subscriber profile could be stored in a memory associated with the storage medium 134 and processed when the transaction request 120 is received. After such processing of the subscriber profile, the request processor 140 can determine the desired delivery format as disclosed herein. In still yet another example, the delivery format can be specified in part in the transaction request 120 and in part by the subscriber profile associated with the transaction request. In other words, both the transaction request 120 and the subscriber profile may cooperate to specify and control the resulting delivery format how the media data content 130 should be supplied at 160.

By way of example, specific media data content 130 (e.g., audio file, video file, and so forth) is stored in the storage medium in one format only for delivery of broadcast quality media content for any given media asset. For example, rather than storing multiple copies having differing storage formats, a single file is stored according to a single storage format (e.g., high quality storage format and/or compressed storage format). Additionally, proxies can be associated with each asset in the storage medium 134 to provide low resolution versions of media content, such as can be retrieved for use by digital asset management tools, scheduling system or other system where a user may only need to inspect titles, make offline editing decisions or perform offline editing of available content, for example, without accessing a full, broadcast quality version. When media data content 130 (e.g., a media asset) is requested from media service 136, a predefined profile can be employed to process a given request for the media content, such as to control transformation of the media content to the delivery format (e.g., it can be transcoded and wrapped to match the requestor's requirements). This mitigates the need of saving media in a plurality of differing formats in the storage medium 134 (or cloud described below) and consequently lowers cost by reducing storage and bandwidth requirements. To the subscriber or user of the media service 136 via the API 110, it appears that each media asset requested is available in whatever delivery format or delivery formats they require since the file converter 150 seamlessly transforms the media data content 130 from the storage format to each delivery format on demand at 160.

In another example, the transaction request 120 can include a playlist. The playlist can include an identification of one or more media assets as well as corresponding timing requirements for the delivery format of the requested media assets. Substantially any type of requirement can be specified, such as a length for each segment data clip to send, how many segments to concatenate, and the number and length of blank spaces to be inserted between specified segments of content. In other examples, the playlist can specify a programming segment, a segment of media data content 130 to be removed, a bar, leader, or header to be added to the media data content, a black space insert into the media data content, a break in the media data content, a calendar or time insert into the media data content, or a data spot insert into the media data content. In this manner, the delivery format for a playlist can include a broadcast-ready (or near broadcast-ready) version of one or more media assets. A playlist example format is disclosed herein with respect to FIG. 4.

The transaction request 120 can also specify that the media data content 130 is to be delivered in view of metadata specifications that are stored in the storage medium associated with corresponding media data content 130. For instance, when the media data content 130 is stored at the storage medium 134, an associated metadata file can also be stored along with the metadata specifications. The metadata specifications can be conditionally mapped to a target profile to satisfy the transaction request 120, wherein the conditional mapping includes processing the transaction request to determine which of the metadata specifications are to be fulfilled. In another example, the metadata specification can specify an extensible authentication protocol (EAP) for the media data content 130 (includes protected EAP or PEAP), a program and system information protocol (PSIP) for the media data content, or a temporal component for the media data content.

Generally, EAP is an authentication framework providing for the transport and usage of keying material and parameters generated by EAP methods. Thus, EAP is not a wire protocol. Instead, it defines message formats. Each protocol that uses EAP defines a manner in which to encapsulate EAP messages within that protocol's messages, for example. With respect to PSIP, this protocol is used in digital television systems for carrying metadata about each channel in the broadcast transport stream of a television station and for publishing information about television programs so that viewers can select what to watch by title and description. The PSIP can define virtual channels and content ratings, as well as electronic program guides with titles and (optionally) descriptions to be decoded and displayed. Such EAP and PSIP protocols can be specified in the transaction request 120 and/or in the subscriber profile to control how the file converter 150 combines corresponding metadata with the media data content 130 and how such combined content is formatted and delivered at 160 in response to given request.

Additionally or alternatively, the media service 136 can provide transaction-based billing for retrieval of the media data content 130 based on a size of the media data content and profile requested and/or based on processing required to place the media content into the expected delivery format. Alternatively, the media service 136 can provide a storage-based billing for the media data content 130 based on the size of the media data content stored in the medium 134 or type of the media data content requested. Billing can be electronically generated per transaction or generated periodically after a number of transactions have occurred, for example. The file converter 150 can be configured to transform the stored media data content into the desired delivery format in response to the transaction request. This transforming of content can be performed on-the-fly as the media is being delivered. As used herein, the term on-the-fly relates to ongoing operations of a computer program such as performing transforming operations of the file converter 150 concurrently with other operations of the program (e.g., during background or foreground tasks). When used for encoded data storage, an on-the-fly data stream is automatically encode as it is written and decoded when read back again, transparently to the program, for example. All operations for the file converter 150 described herein can be performed on-the-fly.

On-the-fly transforming options for the file converter can include transcoding, resolution conversion (e.g., transrating), transwrapping, metadata conversion as well as other media transformations based on the transaction request 120. Transcoding is a process for converting the compressed essence type and can be considered the direct digital-to-digital data conversion of one encoding to another, such as for movie data files or audio files. Resolution conversion can involve changing an image size or aspect ratio in the media data content 130, for example. Transwrapping involves changing the file container type for transporting the media data content such as using a secure socket layer in one example or utilizing unsecured wrapper in another example. Metadata conversion can be performed on-the-fly along with transwrapping as the formatted data content is being delivered at 160 in response to the given request.

The file converter 150 can operate several processes including file-specific processes and essence-specific processes. File-specific processes include transwrapping to change file format (e.g., .MXF to .MOV) or essence wrapper (e.g., MPEG program, stream to MPEG elementary stream). This includes metadata conversion to change/remap metadata and metadata creation/conversion to timestamp, provide transaction id, generate an "e-receipt," and so forth. Essence-specific processes include transrating to change bit-rates and transcoding to change compression standard. These processes can also include scaling to change image size, rate conversion to change frame rate (e.g., 30FPS to 25FPS), and watermarking to embed metadata (e.g., transaction, ownership information).

By way of further example, with respect to watermarking, such encoding can be performed dynamically (per transaction and on demand) and on-the-fly in response to a transaction request to embed authentication information into the delivery format payload (e.g., delivery file or metadata). Such embedded and/or encoded information can be utilized to track if a given file that has been previously delivered has been generated by an approved or authorized source. In addition to watermarking information placed into a file or metadata, the authentication information can include time-stamping information, transaction-identifying information, program information, author information, producer information, tags, or other encoded data to identify the source of a file that has been delivered in response to a given transaction request. The authentication information that is dynamically inserted thus can be used to locate and fix media content that has been discovered to include errors as well as for other purposes.

The media service 136 can be offered as a large storage and delivery service such as can be provided by a storage media farm of servers configured collectively as including a storage cloud and associated cloud delivery applications. Cloud storage can be considered a model of networked online storage where data can be stored on virtualized pools of storage which are generally hosted by third parties. Hosting companies can operate large data centers where users or subscribers who require their data to be hosted buy or lease storage capacity and utilize it for their storage needs. Data center operators, operating in the background, can virtualize storage and delivery resources according to requirements of the subscriber and expose them as storage pools (e.g., via the API 110), which the subscribers can themselves use to store and retrieve selected files or data objects. However, as disclosed herein, instead of storing plural versions of a given asset for delivery, the media service can store a single version that is used to fulfill delivery requirements for each request seamlessly to the requestor. Physically, resources can span across multiple servers. Cloud storage services may be accessed through a web service API such as the API 110 or the input API described below with respect to FIG. 2, or through a Web-based user interface, for example.

For purposes of simplification of explanation, in the present example, different components of the systems described herein are illustrated and described as performing different functions. However, one of ordinary skill in the art will understand and appreciate that the functions of the described components can be performed by different components, and the functionality of several components can be combined and executed on a single component or be further distributed across more components. The components can be implemented, for example, as computer executable instructions (e.g., software, firmware), hardware (e.g., CPU, an application specific integrated circuit), or as a combination of both. In other examples, the components could be distributed among remote devices across a network, for example.

Figure 2:
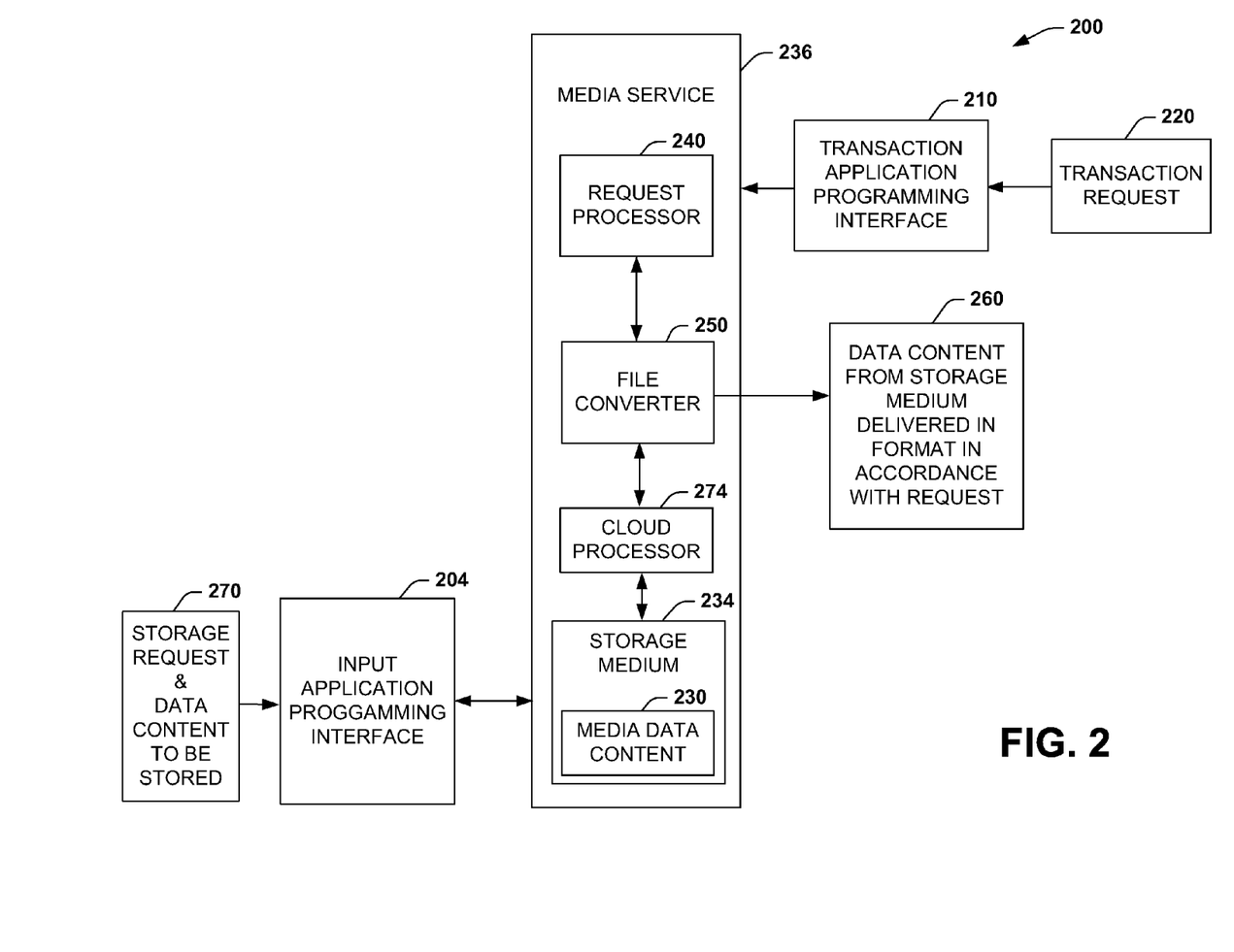
FIG. 2 illustrates an example of a system that employs an input application programming interface to upload data to a media service.

FIG. 2 illustrates an example of a system 200 that employs an input application programming interface 204 to upload data for storage in a media data service 236. Similar to the system 100 described above, the system 200 includes a transaction application programming interface (API) 210 configured to receive a transaction request 220 that specifies media data content 230 located at a storage medium 234 within the media service 236. The transaction request 220 can specify which media data content 230 to retrieve and desired formatting for the media data content, for example. A request processor in the media service 236 can be configured to determine a delivery format for the media data content 230 stored at the storage medium 234 and in response to the transaction request 220. As mentioned above with respect to FIG. 1, this can include multiple delivery formats for a given transaction request. A file converter 250 can be configured to transform the media data content 230 into the delivery format(s) demonstrated at 260, such as to fulfill the transaction request wherein the media data content is delivered in a desired delivery format and/or other specifications as described herein.

The input applications programming interface (API) 204 can be configured to upload the media data content 230 to corresponding applications running in the media service 236. The input API 204 can receive a storage request and the data content to upload, collectively demonstrated at 270. A cloud processor 274 can convert the data content to be uploaded at 270 into a storage format of the storage medium 234 that mitigates storage requirements for the media data content. For instance, the conversion could include transcoding the input data content 270 being supplied into media data content 230 having a different storage format and desired resolution (e.g., a MPEG or MOV format) for storage in the storage medium 234, for example. For example, the cloud processor 274 can be configured to transcode the data content 270 from a content source into a single storage format compatible with the storage medium 234 and also stores a metadata file associated with the media data content. As one example, the cloud processor 274 can store the media content 270 at the storage medium 234 in accordance with a native storage format specified via the storage request.

As a further example, the media content 270 may be supplied in multiple storage formats, such as to support a plurality of predefined delivery formats or include a request to store the content in such multiple formats. In response to such request and multiple versions of a given media asset, the cloud processor 274 can still store the content 270 in the single (e.g., best available or native) format to reduce storage requirements as in situations where multiple versions of the asset would be stored. A proxy version of the asset can also be stored in the medium 234 for each media asset. The cloud processor 274 can store information identifying the desired delivery formats as part of profile information such can be associated with a transaction request for the stored content and/or in a corresponding profile, as disclosed herein.

The following provides a brief description for an example process of storing and retrieving data content in the context of the system 200 of FIG. 2. Initially, a subscriber or user generates a client storage request to store (e.g., via XML request) one or more files via the input API 204. The storage request can include a user ID and the file as well as metadata associated with the media asset. Alternatively, the request can include data (a resource locator) identifying the location of the resource containing each file to be stored. The media upload of media data content 230 can begin. The cloud processor 274 can store the media asset in native file storage format or other storage format based on the request and information provided via the API. The cloud processor 274 allocates cloud storage and enables processing components (not shown) to be instantiated and to begin processing the storage request 270. This can include determining media format specifics and discovered based on file format, metadata parsers, and so forth, for example. The cloud processor 274 can populate a media asset management (MAM) database, for example, with updated media asset information based on the initial store request 270. This can also include a quality verification stage where media integrity and format can be verified, for example (e.g., minor errors, syntax repaired, and so forth). After the media upload has completed, a delivery receipt can be generated and transmitted back to the user or subscriber, such as can be provided via the input API 204 or other message delivery mechanisms (e.g., email, instant messaging).

When the user or subscriber desires to retrieve media data content 230, which has been stored in the media service 236, the transaction request 220 can be generated via the transaction API 210. Such transaction request 220 can also be specified in a common format, such as XML, for example. As one example, the request 220 can include a user ID along with other parameters such as a requested output resolution (e.g., scale), a requested codec (e.g., transcode), a requested delivery format (e.g., wrapper, .MFX, .AVI, and so forth), a requested metadata structure, a partial fulfillment (e.g., in-point and duration), and/or content from multiple media file sources processed and conformed to a specified output delivery format (e.g., editing, BXF, edit decision list (EDL) based fulfillment). As another example, the other parameters for the delivery format can be specified in a profile, such as stored in the media service, which can be accessed in response to the request 220 to determine delivery format requirements.

After the request 220 has been received, further cloud processing at the storage medium 234 can include instantiating the cloud processor 274 to begin processing the request 220. This can include initiating a file or stream transfer to fulfill the request and generating delivery receipt to the user or subscriber system via the transaction API 210. This can also include updating the MAM database to show recipient and delivery fulfillment details. Such transactions can also be tied into automated billing and/or invoicing systems for the media service 236, for example, which can be generated upon completion of the transaction request 220.

Figure 3:
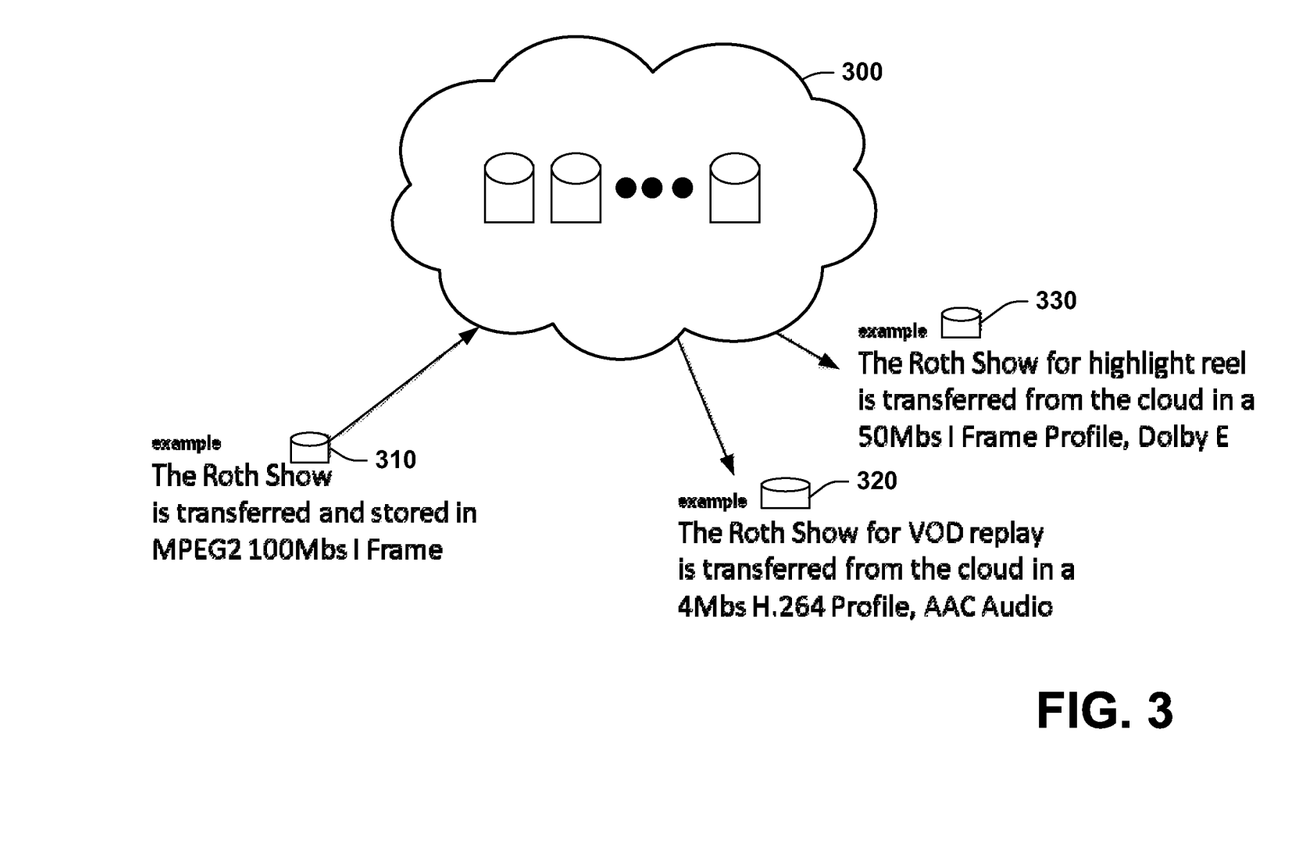
FIG. 3 illustrates an example of a cloud-based network for storing media data in a singular format and delivering such data in desired formats based upon a request.

FIG. 3 illustrates an example of a cloud-based network for storing media data in a singular storage format and delivering such data in desired delivery formats in response to a request. In this example, the media service is implemented as including a cloud system 300 (also referred to as cloud) that includes one or more databases for storing media files. In this example, a broadcast media asset (e.g., a television program) shown at 310 and entitled, "The Roth Show" is transferred to the cloud 300 and stored in MPEG2 I-frame format at 100 Mbs. As can be appreciated, other compression formats and frame rates can be employed for a storage format for the cloud 300, and the storage format can vary depending on what information is available for a given media asset. At some future point, The Roth Show stored at 310 can be retrieved from the cloud 300.

In one retrieval example at 320, the Roth Show can be retrieved upon request, delivered as a video on demand (VOD) replay, and transferred from the cloud 300 to the subscriber in a delivery format of 4 Mbs, H.264 Profile, that includes ACC audio. Such delivery formatting can be based on the transaction request to receive The Roth Show at 320 and/or in a profile defining delivery requirements for the request and/or the requestor. At 330, The Roth Show can also be delivered for a highlight reel application and is transferred from the cloud in a 50 Mbs I-frame profile utilizing Dolby E technology for audio. A plurality of various delivery formats can be provided from the cloud 300 in addition to or as alternatives to the examples shown at 310 and 320. Such delivery formats can be generated by the file converter described above and upon request and/or profile specification. The multiple delivery fulfillments can be in response to a single request for the asset. Alternatively, each output of the asset can be provided individually in response to separate requests for the asset.

Figure 4:
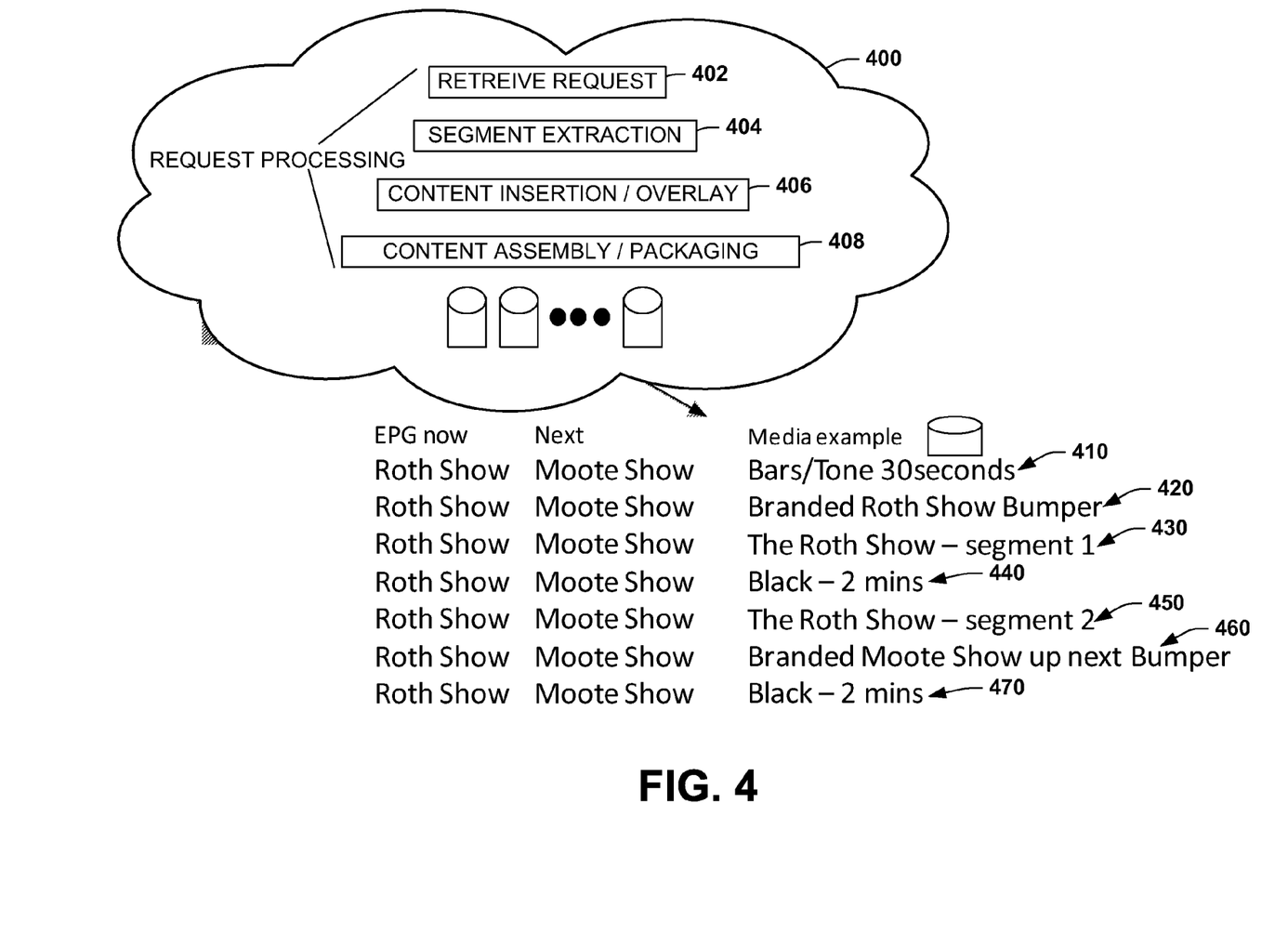
FIG. 4 illustrates an example of delivering media data files in accordance with playlist requirements.

FIG. 4 illustrates an example of delivering media data files to fulfill a playlist transaction request. As shown, a cloud media service 400 transfers The Roth Show in media segments that are specified in a playlist transaction request. An example request processing method, which can be implemented as computer-executable instructions implemented within the cloud service 400, may include retrieving a request at 402 and performing segment extraction at 404. Segment extraction can include parsing the request to determine individual playlist elements that combine to define playout parameters for one or more media assets such as a television show or audio snippet, advertising breaks and the like. When the segments for the playlist have been extracted at 404, a content insertion and/or overlay procedure can begin. This may include concatenating some segments in a temporal manner (e.g., stream 1, stream 2, and so forth), and can include overlying content (e.g., other media assets stored in the cloud service 400) on potions of other content, such as may include overlaying a piece of text or graphics on top of an existing background scene.

Each corresponding media asset retrieved in response to the playlist transaction request can further be transformed to the appropriate delivery format(s) such as disclosed herein. The request processing can also include content assembly and packaging 408 where the specified segments in the request playlist are combined into corresponding output delivery content. For example, the assembled media content can be delivered as an aggregate file for each playlist element or as continuous stream for delivery to a subscriber for playout in the delivery format such as shown a specific example beginning at 410. Alternatively, the cloud service can deliver each media content in the delivery format for each playlist element as separate files. Thus, the cloud service 400 can be programmed to instantiate functions and methods to perform pre-processing of media asset for fulfillment of the playlist transaction request.

In the illustrated example, the resulting delivery content for the playlist transaction request can include a bars/tone segment at 410. A branded Roth Show bumper can also be delivered as part of the delivered content at 420 in response to the request. A first content segment of The Roth Show is delivered at 430. A dark or black segment can be delivered for two minutes at 440. Following segment 1, a second content segment for The Roth Show is delivered at 450. A bumper for a subsequent show is delivered at 460 followed by another two minute black period at 470. As can be appreciated, a plurality of playlists, playlist segments, and playlist configurations can be specified and delivered according to user specifications in the request to retrieve media files from the cloud 400 and/or in profiles stored in the cloud service 400 that can also specify programming requirements. Moreover, each unit of content can include a respective delivery format, which can vary depending on the type of content. As disclosed herein, the delivery format can also vary based on the playlist transaction request, such as according to specified delivery instructions and/or profile information that may be stored in the cloud 400.

Figure 5:
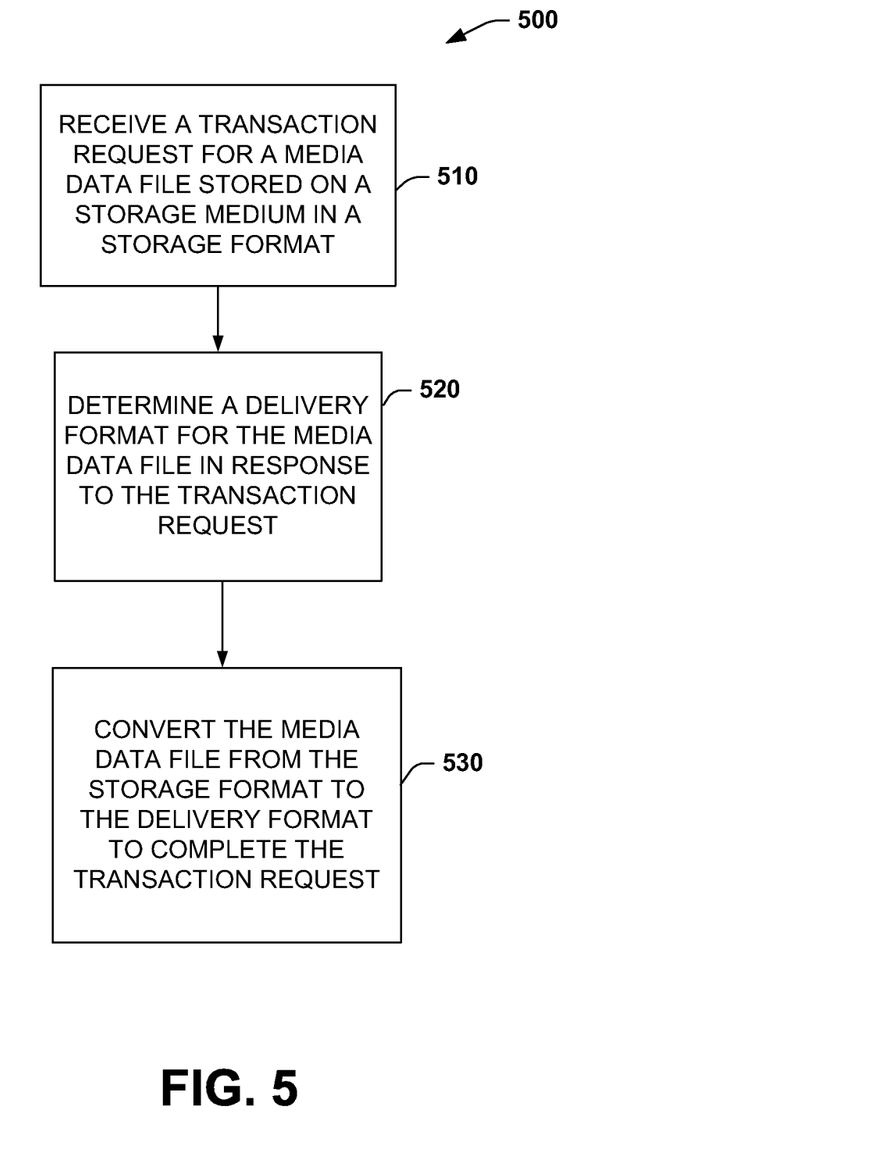
FIG. 5 illustrates an example method for providing virtual format storage and delivery of media data.

In view of the foregoing structural and functional features described above, an example method will be better appreciated with reference to FIG. 5. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an IC or a controller, for example.

FIG. 5 illustrates an example method 500 for media service that provides virtual format storage and delivery of media data. The method 500 includes receiving a transaction request for a media data file stored on a storage medium in a storage format at 510 (e.g., via API 110 of FIG. 1). At 520, the method 500 includes determining a delivery format for the media data file in response to the transaction request (e.g., via request processor 140 of FIG. 1). At 530, the method 500 includes converting the media data file from the storage format to the delivery format to complete the transaction request (e.g., via file converter 150 of FIG. 1). Although not shown, other examples of the method 500 can include the delivery format being specified in the transaction request. This can also include the delivery format being specified in a profile associated with the transaction request or the requestor. The method 500 can also include transcoding, transrating, transwrapping and/or otherwise modifying the content of the media data file from a single storage format into any of a plurality of delivery formats such that storage requirements of the storage medium can be reduce relative to existing systems.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory computer readable medium configured to store computer executable instructions comprising a media service, the media service comprising:
a request processor configured to process a transaction request for a given media asset and to determine a delivery format for corresponding media data content in response to the transaction request; and
a file converter configured to:
access media data content stored in a non-transitory storage medium configured to store the media data content for a plurality of media assets in a storage format for the given media asset from the storage medium, wherein the transaction request comprises a playlist request that specifies an arrangement of elements, the arrangement of elements comprising at least a plurality media segments in which each media segment corresponds to a portion of the given media asset; and
transform the arrangement of elements, including at least the accessed media data content, from the storage format into the delivery format based on the transaction request, the arrangement of elements specified by the playlist including a parameter that specifies at least timing requirements for broadcasting each element, including each of the media segments, in the delivery format, wherein transforming the arrangement of elements comprises:
converting a resolution of each of the plurality of media segments in response to the transaction request to another resolution corresponding to the delivery format; and
transwrapping each of the plurality of media segments from a storage container type associated with the storage format to a delivery container type associated with the delivery format.

2. The non-transitory computer readable medium of claim 1, wherein the delivery format is specified in the transaction request.

3. The non-transitory computer readable medium of claim 1, wherein the delivery format is specified in a subscriber profile associated with the transaction request.

4. The non-transitory computer readable medium of claim 3, wherein the delivery format is specified based on the transaction request and the subscriber profile associated with the transaction request.

5. The non-transitory computer readable medium of claim 1, wherein the playlist request specifies at least two of a programming segment, a segment of media data content to be removed, a bar, leader, or header to be added to the media data content, a black space insert into the media data content, a break in the media data content, a calendar or time insert into the media data content, or a data spot insert into the media data content.

6. The non-transitory computer readable medium of claim 1, wherein the transaction request specifies that the media data content is to be delivered in view of metadata specifications that are stored in associated with the media data content for the given media asset.

7. The non-transitory computer readable medium of claim 6, wherein the metadata specifications are conditionally mapped to a target profile to satisfy the transaction request, wherein the conditional mapping includes processing the transaction request to determine which of the metadata specifications are to be fulfilled.

8. The non-transitory computer readable medium of claim 6, wherein the metadata specification specifies an extensible authentication protocol (EAP) for the media data content for the given media asset, a program and system information protocol (PSIP) for the media data content for the given media asset, or a temporal component for the media data content for the given media asset.

9. The non-transitory computer readable medium of claim 1, wherein the media service provides transaction-based billing for retrieval of the media data content based on a size of the media data content for the given media asset and profile requested, the non-transitory computer readable medium further comprising an application programming interface that provides a storage-based billing for the media data content based on at least one of the size of the media data content or type of the media data content requested.

10. The non-transitory computer readable medium of claim 1, wherein the file converter is configured to perform at least one of transcoding, resolution conversion, transwrapping, or metadata conversion based on the transaction request.

11. The non-transitory computer readable medium of claim 1, further comprising a cloud processor to transform the media data content for the given media asset into a storage format of the storage medium that mitigates storage requirements for the media data content for the given media asset, the storage format being different from each delivery format of the given media asset.

12. The non-transitory computer readable medium of claim 11, wherein the cloud processor is configured to transcode the media data content for the given media asset into a single storage format compatible with the storage medium and stores a metadata file associated with the media data content for the given media asset.

13. The non-transitory computer readable medium of claim 11, wherein the cloud processor is configured to store the media data content for each of the plurality of media assets at the storage medium in accordance with a native format specified via a storage request.

14. The non-transitory computer readable medium of claim 1, wherein in response to the transaction request the file converter dynamically inserts tracking information into the corresponding media content having the delivery format concurrently with transforming the arrangement of elements from the storage format to the delivery format, wherein the tracking information includes a watermark identifying a source of the media content.

15. A method, comprising:
receiving a transaction request for a media data file stored on a storage medium in a storage format, the media data file comprising a plurality of media segments each corresponding to a respective portion of a given media asset;
determining an appropriate delivery format for each of the media segments of the media data file and an appropriate broadcast time for each of the media segments based on the transaction request; and
converting each of the media segments of the media data file from the storage format to the appropriate delivery format to complete the transaction request, wherein the converting comprises:
converting resolution of each of the media segments of the media data file stored on the storage medium in response to the transaction request to another resolution corresponding to the appropriate delivery format; and
transwrapping each of the media segments of the media file from a storage container type associated with the storage format to a delivery container type associated with the appropriate delivery format.

16. The method of claim 15, wherein the delivery format is specified in the transaction request.

17. The method of claim 16, wherein the delivery format is specified in a profile associated with the transaction request, the method further comprising access the profile in response to the transaction request to determine the delivery format.

18. The method of claim 15, further comprising transcoding the media data file into a single storage format that mitigates storage requirements of the storage medium.

19. The non-transitory computer readable medium of claim 1, wherein a given element of the arrangement of elements includes selected media content and wherein the playlist request specifies that the selected media content is to be inserted into the given media asset.

20. The non-transitory computer readable medium of claim 19, wherein the playlist request specifies timing information that specifies a time schedule to insert the selected media content into the given media asset.

21. The non-transitory computer readable medium of claim 1, wherein a given element of the elements includes selected media content and wherein the playlist request specifies that the selected media content is to be overlaid onto the accessed media content.

22. The non-transitory computer readable medium of claim 21, wherein the playlist request specifies timing information that specifies a time schedule to overlay the selected media content onto the accessed media content.

23. The non-transitory computer readable medium of claim 1, wherein the playlist request specifies a time and duration of a concatenation of the accessed media content.

24. The non-transitory computer readable medium of claim 1, wherein the accessed content comprises a plurality of the elements, each of the plurality of the elements are arranged as specified by the playlist request in a single media file in the delivery format.

25. The non-transitory computer readable medium of claim 23, wherein the media service provides transaction-based billing for retrieval of the media data content based on a number and type of operations performed by the media service to form the single media file and based on a number and type of the elements specified by the playlist request.

26. The method of claim 15, wherein the converting further comprises adding metadata of the media file to include a description of media content in the media data file.

* * * * *